Figure 1:
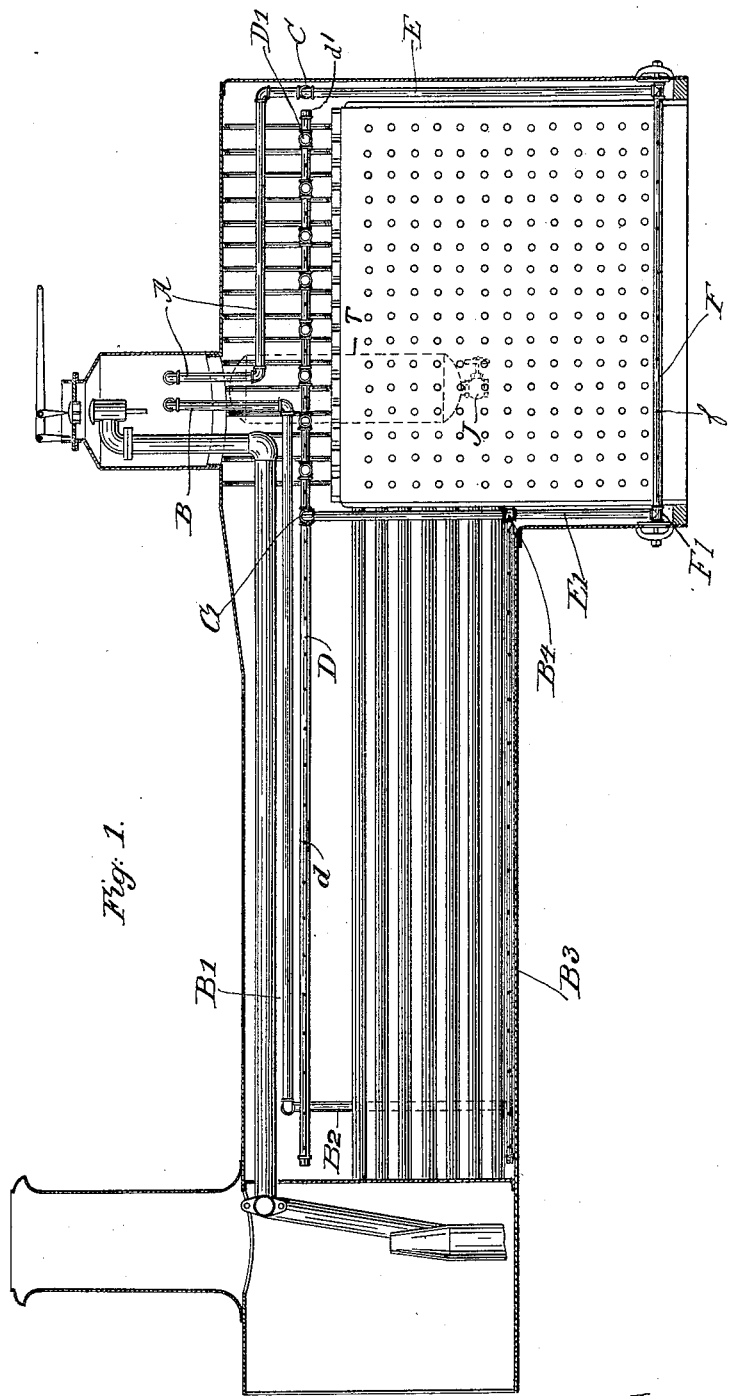

(No Model.) 2 Sheets—Sheet 1.

P. A. KIMBURG.
WATER PURIFYING DEVICE FOR LOCOMOTIVE BOILERS.

No. 583,485. Patented June 1, 1897.

Witnesses:
Fred Borg
L. A. Murphy.

Inventor:
P. A. Kimburg
By W. E. Williams
atty

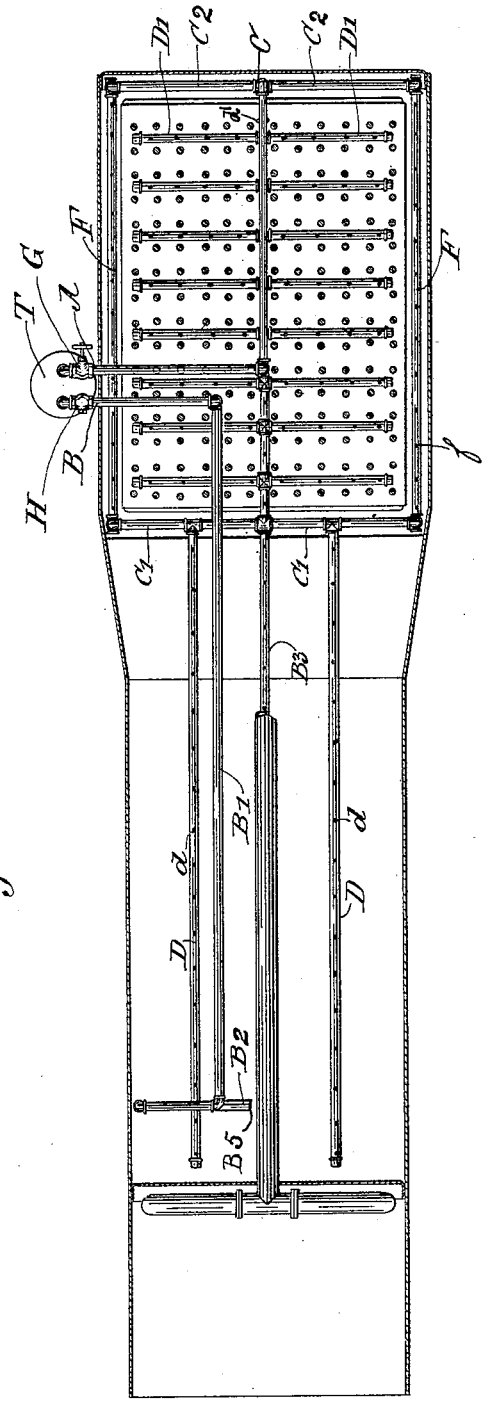

UNITED STATES PATENT OFFICE.

PETER ALSDROFF KIMBURG, OF CHICAGO, ILLINOIS.

WATER-PURIFYING DEVICE FOR LOCOMOTIVE-BOILERS.

SPECIFICATION forming part of Letters Patent No. 583,485, dated June 1, 1897.

Application filed February 11, 1897. Serial No. 622,933. (No model.)

*To all whom it may concern:*

Be it known that I, PETER ALSDROFF KIMBURG, a citizen of the United States, residing at Chicago, in the county of Cook and State of Illinois, have invented a new and useful Improvement in Water Purifying and Circulating Devices for Locomotive-Boilers, of which the following is a specification.

The objects of my invention are to provide means for producing a greater circulation of the water in a boiler and for carrying the sediment to a sediment-tank on the outside of a boiler; and I accomplish these results by means of a system of circulating-pipes and a sediment-tank, as will be hereinafter explained; and the invention consists in the devices set forth in the claims hereof.

Reference will be had to the accompanying drawings, in which—

Figure 1 is a side sectional view of a locomotive-boiler equipped with my device. Fig. 2 is a plan sectional view.

In the drawings, T designates the sediment-tank, supported at the exterior of the boiler in any suitable place. To this tank is connected the pipe A, which conducts the water from the boiler into the tank T, and it is provided with a regulating-valve G.

B designates the pipe which returns the water from the tank T to the boiler and is provided with a check-valve H, preventing the water from flowing backward into the tank.

The pipe A extends above the fire-box, as is shown in Fig. 1, and is connected at C to a cross-pipe $C^2$, which extends across the boiler at or near the normal surface of the water, and is connected to pipes E, extending down the sides of the water-legs, and connected to pipes F, lying at the bottom of the water-legs, and provided with perforation $f$ for the entry of the water and sediment. At the other end of pipes F at F' there are connected riser-pipes E', which rise up and connect to a cross-pipe C' at the normal surface of the water. Connected to pipes E' at $B^4$, Fig. 1, is a cross-pipe (not shown) to which is connected the perforated pipe $B^3$, lying along the bottom of the shell of the boiler. Connected to cross-pipe C' at the normal surface of the water there is a system of pipes D, having perforations $d$. This system of pipes D is provided with transverse pipes D', lying over the crown-sheet, and the main member terminates at a cap $d'$. The pipe B from tank T enters the dome of the boiler and passes downward and along the steam-space of the shell, as is shown by B', and is connected to a pipe $B^2$, extending downward around the flues, and is open at the end $B^5$ in the bottom of the shell.

In the bottom of tank T there is a blow-off valve J. In starting the apparatus the valve G is opened and the valve J opened a very little. Thus the water is forced out of pipe A into tank T, which water is drawn in from the perforated system of pipes, being pipes F, $B^3$, D, and D', which contain the waters at the bottom of the boiler heavy with sediment, and the waters at the top of the boiler charged with floating impurities, which are carried to tank T. The check-valve H prevents anything coming from the boiler to the tank T by pipe B. It is only necessary to open valve J at the start to start the circulation, when it may be closed, and the circulation will continue. The circulation is induced in the direction stated by reason of the heating of the water in the riser-pipes E and cross-pipes $C^2$ and pipe A, causing it to expand and flow toward the tank, and the heating of the water in pipes B and B' causes the water in them to flow out through the opening $B^5$ and cause a suction from tank T. At any rate, after the apparatus is started the circulation takes place, as described.

The scum-charged water at the top of the boiler and the water laden with sediment from the bottom of the boiler is carried around to tank T, and the sediment is there deposited, and the water thus purified is carried back into the boiler and heated in its passages and is discharged in the bottom of the shell and intermingles with the colder water there, and thus displaces it, as it were, causing the cold water to become more heated or to flow around through the system of pipes by way of the tank and in turn to the boiler again.

Whatever may be the theory for the operation of these devices, the facts are known by its use that the sediment, mud, dirt, and impurities which ordinarily collect in the bottom of the boiler and in water-legs are deposited in the tank T with this device to such an extent that it is scarcely found necessary at any time to wash out the mud from the bottom of the water-legs.

The pipe A, entering the tank T from the top and discharging downward, aids in precipitating the sediment in the tank, and the return-pipe B, rising out of the top of the tank T, takes the water thus purified back to the boiler.

What I claim is—

1. In a device for the purpose described, the combination of a sediment-tank located on the outside of the boiler, of a pipe extending along the normal surface of the water, and provided with perforations for the entry of the water, of a set of perforated pipes lying along the bottom of the shell and water-legs, of a set of riser-pipes connecting the upper set of perforated pipes with the lower set, and a riser connecting to the lower set with the sediment-tank as shown, with a return-pipe from the tank passing along the steam-space above the water-level, and connected by a drop-pipe to the bottom of the boiler-shell, in the manner shown, and for the purpose described.

2. The combination of a sediment-tank located on the outside of the boiler, of a system of perforated pipes lying at the normal surface of the water, and provided with a set of cross-pipes lying transversely of the crown-sheet, and in close proximity thereto, with a set of perforated pipes lying at the base of the water-legs, risers connecting the lower set of pipes with the upper set, and a riser from the lower set connected to the sediment-tank, and a return-pipe from the tank to the lower surface of the shell, substantially as shown.

3. The combination of a sediment-tank located on the outside of the boiler, of a system of perforated pipes lying along the normal surface of the water, of a system of perforated pipes lying along the bottom of the shell and water-legs, of pipes connecting the upper set with the lower set of perforated pipes connecting with the sediment-tank, which pipe enters the tank from the top and discharges downward into the tank, with a return-pipe from the tank rising out of the top of the tank and entering the steam-space of the boiler and passing along said steam-space and discharging at the bottom of the shell, combined and arranged substantially as, and in the manner set forth.

4. The combination of the perforated pipe $B^3$ at the bottom of the shell, of the pipes F at the bottom of the water-legs, of pipes connecting the pipe $B^3$ and pipes F, of riser-pipes E connecting pipes F to a riser-pipe A, of a valve in riser-pipe A, with a sediment-tank T to which pipe A is connected, and a return-pipe B from the tank T to the boiler, and said pipe B provided with a check-valve H and having its return portion passing along the steam-space of the boiler and discharging at the bottom of the shell, substantially as shown.

In witness whereof I have hereunto subscribed my name, on this 29th day of December, 1896, in the presence of two subscribing witnesses.

PETER ALSDROFF KIMBURG.

Witnesses:
FRED BORG,
J. D. CALDWELL.